(12) United States Patent
Wei et al.

(10) Patent No.: US 8,537,736 B2
(45) Date of Patent: Sep. 17, 2013

(54) METHODS AND SYSTEMS FOR WIRELESS MULTICAST AND BROADCAST SERVICES

(75) Inventors: Hung-Yu Wei, Taipei (TW);
Ching-Chun Chou, Taipei (TW)

(73) Assignees: Industrial Technology Research Institute, Chutung, Hsinchu (TW);
National Taiwan University, Taipei (TW)

( * ) Notice: Subject to any disclaimer, the term of this patent is extended or adjusted under 35 U.S.C. 154(b) by 851 days.

(21) Appl. No.: 12/686,953

(22) Filed: Jan. 13, 2010

(65) Prior Publication Data
US 2010/0214971 A1 Aug. 26, 2010

Related U.S. Application Data

(60) Provisional application No. 61/155,210, filed on Feb. 25, 2009.

(51) Int. Cl.
*H04H 20/71* (2008.01)
(52) U.S. Cl.
USPC .......................................... 370/312; 370/230
(58) Field of Classification Search
USPC .............. 370/230, 230.1, 231–235, 242, 312, 370/335–336, 342, 432, 441–442, 389, 392, 370/465
See application file for complete search history.

(56) References Cited

U.S. PATENT DOCUMENTS

| | | | | |
|---|---|---|---|---|
| 6,901,063 B2 * | 5/2005 | Vayanos et al. | | 370/335 |
| 7,548,508 B2 * | 6/2009 | Geile et al. | | 370/208 |
| 7,590,095 B2 * | 9/2009 | Chen et al. | | 370/335 |
| 2002/0054578 A1 * | 5/2002 | Zhang et al. | | 370/328 |
| 2005/0180415 A1 * | 8/2005 | Cheung et al. | | 370/389 |
| 2007/0280233 A1 | 12/2007 | Bush | | |
| 2008/0031177 A1 * | 2/2008 | Lee et al. | | 370/312 |
| 2008/0291834 A1 | 11/2008 | Chou et al. | | |
| 2010/0046481 A1 * | 2/2010 | Chen et al. | | 370/335 |
| 2012/0192026 A1 * | 7/2012 | Chen et al. | | 714/751 |

OTHER PUBLICATIONS

Hamiti et al., "IEEE 802.16m System Description Document," dated Feb. 7, 2009.
Hua Xu, et al., "Network coding-based retransmission schemes for E-MBS with and without MS feedback," IEEE 802.16m Session #59, Jan. 13, 2009.

* cited by examiner

*Primary Examiner* — Kevin Mew
(74) *Attorney, Agent, or Firm* — Finnegan, Henderson, Farabow, Garrett & Dunner, LLP

(57) ABSTRACT

A method for data communication may include transmitting, by a data communication device, a data group comprising a first group of data items having a first number of data items, and receiving, by the data communication device, a feedback message indicating a transmission error relating at least a portion of the first group of data items transmitted from the data communication device. The method may also include processing the first group of data items, by a data processing device, to provide a second group of data items having a second number of data items, and generating, by a data coding device, a correction data packet based on the second group of data items and information included in the feedback message, for correcting the transmission error. The method may further include transmitting, by the data communication device, the correction data packet.

25 Claims, 7 Drawing Sheets

METHODS AND SYSTEMS FOR WIRELESS MULTICAST AND BROADCAST SERVICES

PRIORITY

This application claims the benefit of priority of U.S. Provisional Application No. 61/155,210, filed Feb. 25, 2009, and titled "NETWORK CODING TRANSMISSION METHOD FOR WIRELESS MULTICAST AND BROADCAST SERVICES," the entire contents of which are incorporated herein by reference.

TECHNICAL FIELD

The present disclosure relates generally to methods and systems for wireless multicast and broadcast services and, more particularly, to methods and systems for wireless multicast and broadcast services using network coding.

BACKGROUND

In a communication system, such as a wireless telecommunication system, data may be transmitted over the air between a base station and multiple static or mobile stations, such as, for example, personal computers, hand held devices, televisions, and cell phones. As high speed communication technologies, such as, high speed internet, WiMAX, high speed cellular network, become increasingly accessible to the general public, multicast broadcast services (MBS) have become a popular portion of wireless communication systems. Multicast broadcast services include multimedia contents, such as video and/or audio streams, text messages, and pictures. Multicast broadcast services provide a solution for one-to-multiple data transmission. For example, in a wireless cellular network, the base station can simultaneously transmit MBS data to multiple receivers, such as cellular phones, laptops, and PDAs.

IEEE 802.16 standard is developed for governing applications in high bandwidth wireless network access for both mobile and static users. The current version under development is 802.16m. One of the focuses in the IEEE 802.16m standard is multicast broadcast services (MBS), which may also be referred to as enhanced MBS (EMBS). The base station transmits MBS data to the mobile stations simultaneously, using the same modulation and coding scheme (MCS).

Network coding technology can be used to encode data for Multicast Broadcast Services (MBS) data transmission in various communication systems, such as, for example, WiMAX systems and 4G cellular systems. Network coding technology can reduce the amount of data transmitted over a network, thereby increasing the network operation efficiency. For example, IEEE C802.16m-09/0072r1, by Hua Xu, et al., titled "Network coding-based retransmission schemes for E-MBS with and without MS feedback," IEEE 802.16m Session #59, Jan. 13, 2009, provides a network coding retransmission scheme for EMBS. However, the network coding retransmission scheme proposed by Hua Xu et al. is performed using an arbitrary retransmission block size without an uplink feedback. This random network coding scheme may adversely affect the data transmission reliability in some applications.

Accordingly, it may be desirable to have methods or systems that, in some applications, may provide improvements over the existing technology.

SUMMARY

In one exemplary embodiment, the present disclosure is directed to a method for data communication. The method includes transmitting, by a data communication device, a data group comprising a first group of data items having a first number of data items. The method also includes receiving, by the data communication device, a feedback message indicating a transmission error relating at least a portion of the first group of data items transmitted from the data communication device. The method also includes processing the first group of data items, by a data processing device, to provide a second group of data items having a second number of data items based on the first group of data items. The method also includes generating, by a data coding device, a correction data packet based on the second group of data items and information included in the feedback message, the correction data packet being configured for correcting the transmission error and comprising a portion of the first group of data items. The method further includes transmitting, by the data communication device, the correction data packet.

In one exemplary embodiment, the present disclosure is directed to a method for data communication. The method includes receiving, by at least one data receiving terminal, a data group comprising a first group of data items having a first number of data items transmitted from a data communication device. The method also includes providing, by the at least one data receiving terminal, a feedback message to the data communication device, the feedback message indicating a transmission error. The method also includes receiving, by the at least one data receiving terminal, a correction data packet configured for correcting the transmission error. The method also includes decoding, by the at least one data receiving terminal, the correction data packet. The method further includes correcting, by the at least one data receiving terminal, the transmission error based on the decoded correction data packet.

In one exemplary embodiment, the present disclosure is directed to a system for data transmission. The system includes a data communication device configured to transmit a data group comprising a first group of data items having a first number of data items. The data communication device is also configured to receive a feedback message indicating a transmission error associated with the data group. The data communication device is also configured to apply a network coding to a second group of data items having a second number of data items obtained from the data group. The data communication device is also configured to generate a correction data packet based on the second group of data items and information from the feedback message, the correction data packet configured for correcting the transmission error. The data communication device is further configured to transmit the correction data packet. The system also includes a data receiving terminal configured to receive the data group comprising the first group of data items. The data receiving terminal is also configured to provide a feedback message to the data communication device, the feedback message indicating the transmission error that is associated with the data group. The data receiving terminal is also configured to receive the correction data packet, decode the correction data packet, and correct the transmission error based on the decoded correction data packet.

DETAILED DESCRIPTION

Figure 1:
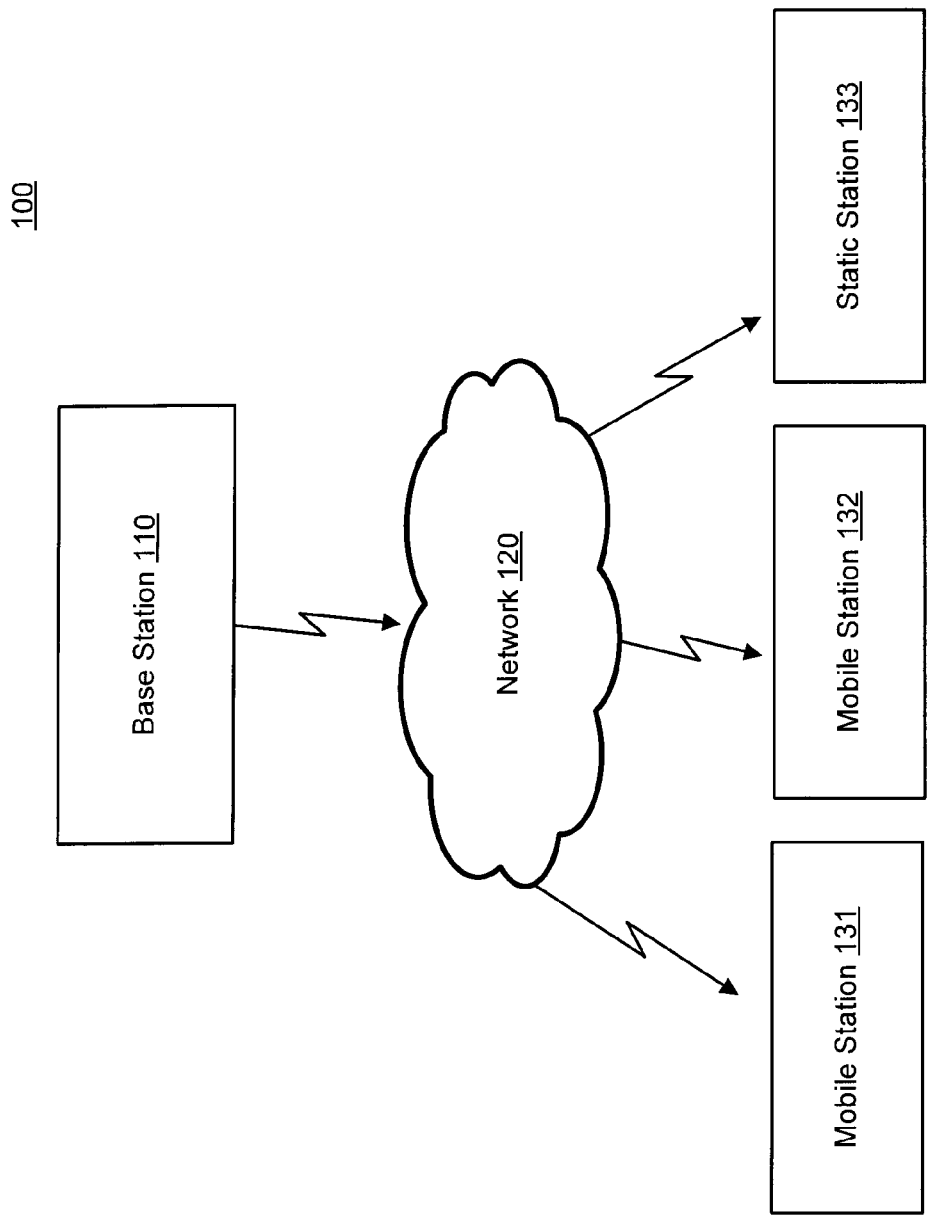
FIG. 1 illustrates an exemplary communication system consistent with the disclosed embodiments.

FIG. 1 illustrates an exemplary communication system 100 consistent with the disclosed embodiments. Communication system 100 may be any communication system, for example, a television communication system, a wireless cellular communication system, a high speed internet system, etc. Communication system 100 may include a data communication device configured to transmit data to at least one data receiving terminal. For illustrative and discussion purposes, a base station 110 is shown in FIG. 1 as an exemplary embodiment of the data communication device. One of ordinary skill in the art can appreciate that the data communication device may be any other suitable devices. Although only one base station 110 is shown in FIG. 1, it is understood that the communication system 100 may include two or more base stations.

Mobile stations 131 and 132 and a static station 133 are shown as examples of the at least one data receiving terminal. Each of mobile stations 131 and 132 may be a hand held device, such as a PDA, a cell phone, a laptop, etc. Static station 133 may be a desktop computer, a television, etc. A data receiving terminal, e.g., each of mobile stations 131 and 132, and static station 133, may be configured to receive data transmitted from base station 110, and/or to transmit data to base station 110. Mobile stations 131 and 132, and static station 133 may communicate with base station 110 through a network 120. Network 120 may include any suitable network, such as a high speed internet network, a Wi-Fi network, a WiMAX network, a GSM network, etc. Network 120 may be wired or wireless. For illustrative purposes, in below discussions, mobile stations 131 and/or 132 will represent the at least one data receiving terminal. One of ordinary skill in the art can appreciate that the same discussion involving mobile stations 131 and/or 132 may also be applicable to static station 133.

Figure 2:
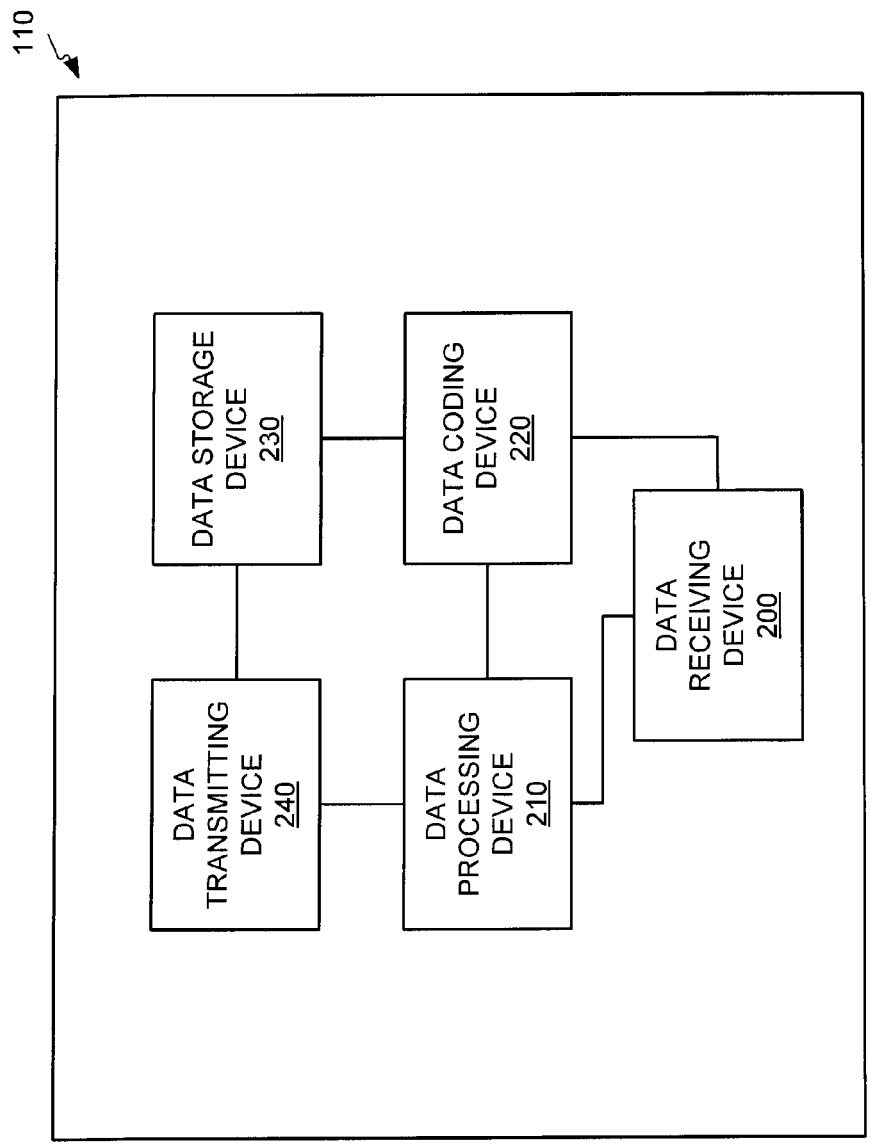
FIG. 2 illustrates an exemplary base station consistent with the disclosed embodiments.

FIG. 2 schematically illustrates an exemplary base station 110 consistent with the disclosed embodiments. Base station 110 may include a data receiving device 200, a data processing device, 210, a data coding device 220, a data storage device 230, and a data transmitting device 240. One of ordinary skill in the art can appreciate that base station 110 may include a greater or lesser number of components.

Data receiving device 200 may be configured to receive data from other devices communicating with base station 110, for example, mobile stations 131 and 132, and/or a control center, which transmits data to base station 110 for further transmission to mobile stations 131 and 132. Data processing device 210 may process data received by data receiving device 200. Data coding device 220 may be coupled with data processing device 210 and/or data receiving device 200. Data coding device 220 may receive data from data processing device 210 and/or data receiving device 200, and may apply a coding scheme, such as a network coding scheme, a permutation algorithm, a turbo code encoding algorithm, or any suitable coding schemes, to encode received data. Data storage device 230 may be configured to store data, and may include a memory, a hard drive, an optical disc drive, or any suitable form of data storage media. At least one of the data receiving device 200, data processing device 210, and the data coding device 220 may be coupled, directly or indirectly, with data storage device 230. For example, data coding device 220 may transmit encoded data to data storage device 220 for storage. Each of the data receiving device 200 and data processing device 210 may also directly transmit data to data storage device 230 for storage. Data coding device 220 and/or data processing device 210 may read data from data storage device 230 for encoding and/or processing.

Data transmitting device 240 may be configured to transmit data to external devices that communicate with base station 110 through network 120. For example, data transmitting device 240 may transmit data to mobile stations 131 and 132, and/or the control center. Data transmitting device 240 may include an antenna or other components known in the art. At least one of data processing device 210, data coding device 220, and data storage device 240 may be directly or indirectly coupled with data transmitting device 240, and may send data to data transmitting device 240 for transmission. For example, data processing device 210 may send processed data to data transmitting device 240 for transmission. Data storage device 240 may send stored data to data transmitting device 240 for transmission. Data coding device 220 may send coded data directly to data transmitting device 240 for transmission.

Figure 3:
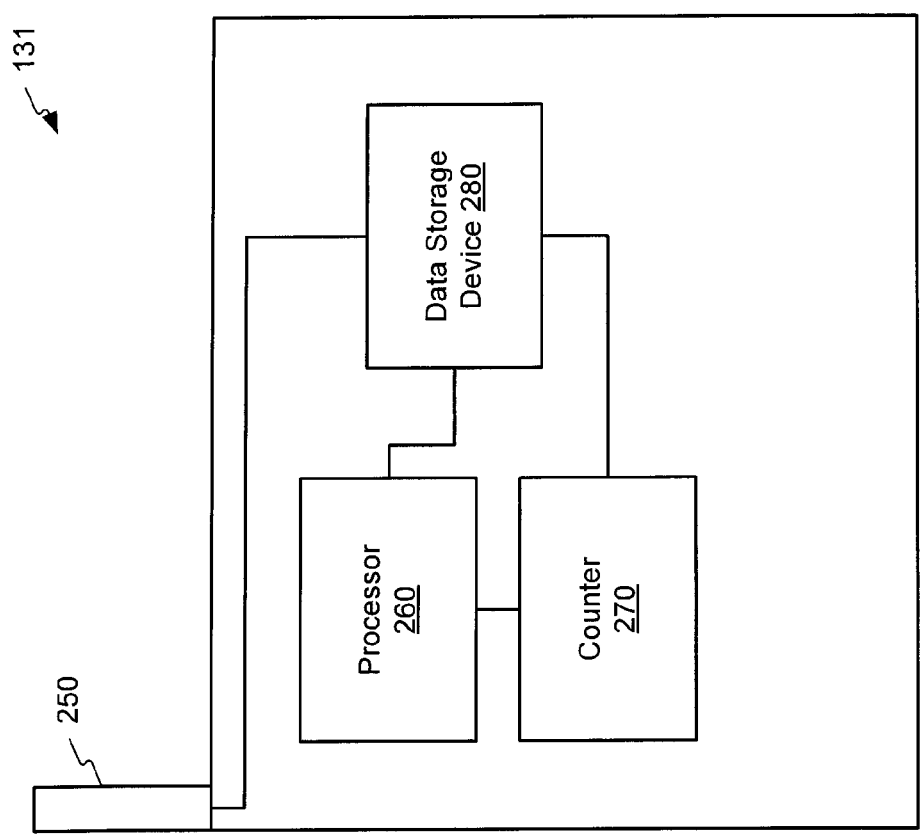
FIG. 3 illustrates an exemplary mobile station consistent with the disclosed embodiments.

FIG. 3 schematically illustrates an exemplary mobile station 131 consistent with the disclosed embodiments. Mobile station 131 may include a data transmitting and receiving component 250 configured to transmit and receive data to and from base station 110. Data transmitting and receiving component 250 may include an antenna or any other data transmitting and receiving components or interfaces. Mobile station 131 may also include a processor 260 configured to process data, for example, data received from base station 110. Processor 260 may be configured to process voice data, text messages, video data, or any suitable types of data. Mobile station 131 may also include a counter 270 configured to count a number. For example, counter 27 may count a number related to data transmitted between base station 110 and mobile station 131. Processor 260 may communicate with counter 270. For example, processor 260 may send a command signal to counter 270 to reset counter 270, or initiate and/or terminate a counting process. Processor 260 may be configured to control or provide counter 270 in various manners. In one embodiment, counter 270 may be integral with processor 260.

Mobile station 131 may further include a data storage device 280 configured to store data, such as, data mobile station 131 received from base station 110. Data storage device 280 may include a memory, a hard disk, or any suitable form of storage devices. For example, data storage device 280 may include an internal or removable memory. Examples of removable memories may include a secure digital (SD) memory card, a multimedia (MC) memory card, and/or a compact flash (CF) memory card. Processor 260 and/or counter 270 may communicate with data storage device 280. For example, processor 260 may read data from data storage device 280 and analyze the data. Processor 260 may send data to data storage device 280 for storage. Counter 270 may send a counted number to data storage device 280 for storage. Counter 270 may read a number from data storage device 280 to use in a counting process. Data storage device 280 may communicate with data transmitting and receiving component 250. For example, data storage device 280 may send data to data transmitting and receiving component 250 for transmission. Data transmitting and receiving component 250 may send received data to data storage device 280 for storage. One of ordinary skill in the art can appreciate that mobile station 131 may include additional components for additional functions, or may include lesser components for simplified operations. Mobile station 132 and/or static station 133 may include similar components as mobile station 131.

Figure 4:
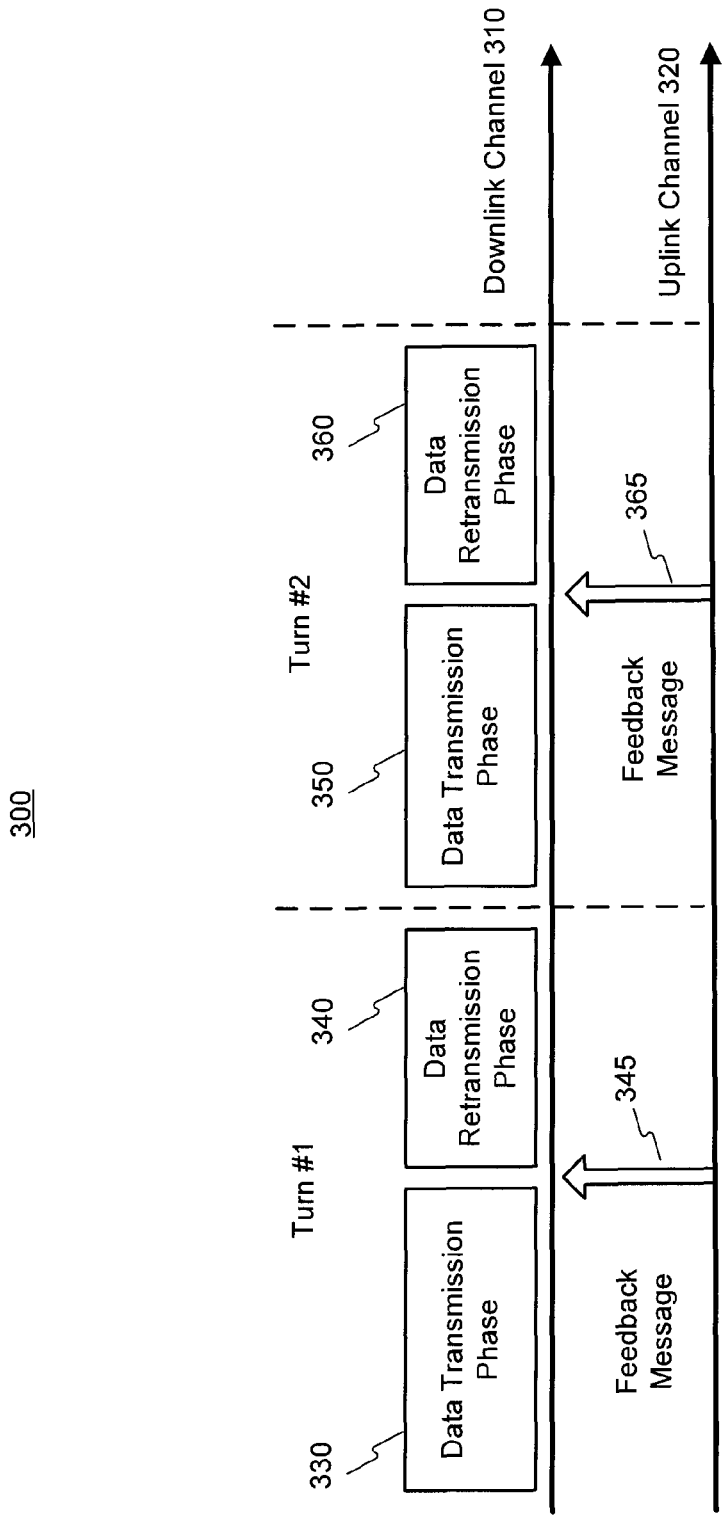
FIG. 4 illustrates an exemplary data transmission process consistent with the disclosed embodiments.

FIG. 4 schematically illustrates a data communication process 300, which may be implemented within communication system 100 for communication between base station 110 and any data receiving terminal, such as mobile station 131. One of ordinary skill in the art can appreciate that the data communication process 300 may be similarly implemented in communications between base station 110 and mobile station 132, or between base station 110 and static station 133.

As shown in FIG. 4, data transmission between base station 110 and mobile station 131 through network 120 may be a two-way communication: data may be transmitted from base station 110 to mobile station 131, e.g., through a downlink channel 310; data may also be transmitted from mobile station 131 to base station 110, e.g., through an uplink channel 320. Data transmission from base station 110 to mobile station 131 via downlink channel 310 may be divided into turns, such as turn #1, turn #2, etc. A turn may represent a data transmission period, during which certain data may be transmitted between base station 110 and mobile station 131. For example, in turn #1, as shown in FIG. 3, base station 110 may transmit data to mobile station 131 in a data transmission phase 330 and a data retransmission phase 340. Mobile station 131 may receive the data transmitted in the data transmission phase 330 and data retransmission phase 340, and may store the received data in data storage device 280. Mobile station 131 may transmit data to base station 110, as shown in FIG. 4. For example, mobile station 131 may provide a feedback message 345 to base station 110 through uplink channel 320. In one embodiment, mobile station 131 may transmit the feedback message 345 to base station after the data transmission phase 330 and before the data retransmission phase 340. Similarly, in turn #2, base station 110 may transmit data to mobile station 131 in a data transmission phase 350 and a data retransmission phase 360. Mobile station 131 may provide a feedback message 365 to base station 110 through uplink channel 320. The feedback message 365 may be provided by mobile station 131 after the data transmission phase 350 and before the data retransmission phase 360. The data communication processes in turn #2 may be substantially similar to the data communication processes in turn #1.

Transmission errors may occur in data communication between base station 110 and mobile station 131. For example, transmission errors may occur in data transmission phase 330 when base station 110 transmits a data group to mobile station 131. A transmission error may take many forms. For example, it may refer to a data item that is received by mobile station 131 with errors due to one or more reasons, such as the data item being lost, corrupted, damaged, or contaminated. A total number of transmission errors may be equal to a total number of data items that are received by mobile station 131 with errors. For discussion purposes, the number of transmission errors may also be referred to as the number of "lost" data items or the number of data items that are received with errors. A data group refers to a combination of data items, and the data items included in the data group may be transmitted continuously or consecutively, or not continuously or consecutively. In some embodiment, a data group may contain one or more data packets or a portion of one or more data packets. A data item refers to a unit of data included within the data group. The data item may refer to a data bit, a data byte, a data block containing a plurality of data bits or bytes, a number, or any suitable data. A data packet, which will be used in below discussion, may include one or more data items. It is noted that the use of different terms, such as, data item, data group, data packet, is only for illustrative purposes, and is not intended to limit the scope of the disclosure.

Still referring to FIG. 4, in the data transmission phase 330, a data group including a first group of data items having a number of data items may be transmitted from base station 110 to mobile station 131 through network 120. The number of data items is identified here as the "first number." When one or more transmission errors occur to the first group of data items, e.g., when one or more data items are lost in the data transmission phase 330, mobile station 131 may receive some of the data items with errors. After receiving the data items, mobile station 131 may process the data items, for example, by processor 260. Processor 260 may determine which data items are received with errors. Counter 270 may count a total number of data items received with errors, i.e., a total number of transmission errors. Mobile station 131 may report the transmission errors to base station 110. Mobile station 131 may transmit the feedback message 345 to base station 110. The feedback message 345 may indicate the total number of transmission errors, i.e., the total number of data items received with errors at mobile station 131.

Mobile station 131 may transmit the feedback message 345 to base station 110 through various mechanisms. In one embodiment, mobile station 131 may transmit the feedback message 345 to base station 110 through a common feedback channel. In the common feedback channel, a common radio resource may be used for all data receiving terminals including mobile stations 131 and 132, and static station 133, or for a certain number of data receiving terminals within a certain group, for example, mobile stations 131 and 132. The common feedback channel may be any suitable type of feedback channel known in the art, such as, a busy-tone type or a Code Division Multiple Access (CDMA) code type. For the busy-tone type feedback channel, separate transmission slots may be reserved for reporting the transmission errors. Each transmission slot may indicate a number of transmission errors in the data transmission phase 330. For example, a first transmission slot may indicate one transmission error, a second transmission slot may indicate two transmission errors, etc. For the CDMA code type feedback channel, a group of CDMA codes may be specified for reporting the transmission errors. The specified codes may include information indicating a reception state of a mobile station with respect to the first group of data items transmitted from base station 110. For example, code #1 may include information indicating one transmission error, and code #2 may include information indicating two transmission errors.

In another embodiment, mobile station 131 may transmit the feedback message 345 to base station 110 through a unicast feedback channel. Similarly, each of mobile station 132 and/or static station 133 may use a unicast feedback channel for reporting the transmission errors. The unicast feedback channel may provide base station 110 with the reception state of each data receiving terminal, e.g., mobile stations 131 and 132, and static station 133, with respect to the data group transmitted in the data transmission phase 330. If the number of mobile stations that fail to receive the data items is small, it may be desirable to use a unicast feedback channel, because in such a situation, the unicast feedback channel may use less radio resources than the common feedback channel. This is because the number of radio resource blocks consumed by the common feedback channel depends on the number of transmission errors, e.g., the number of lost data items, whereas the number of radio resource blocks consumed by the unicast feedback channel depends on the number of mobile stations that experience transmission errors.

Base station 110 may simultaneously transmit the first group of data items to a plurality of data receiving terminals, such as mobile stations 131 and 132, and static station 133. Each data receiving terminal may transmit a feedback message, similar to the feedback message 345, to base station 110 for reporting an transmission error. Thus, base station 110 may receive a plurality of feedback messages indicating transmission errors occurred to the plurality of data receiving terminals.

After receiving the plurality of feedback messages, base station 110 may process the feedback messages, for example, through data processing device 210, to obtain information relating to the transmission errors. For example, base station 110 may obtain the total number of transmission errors from the received feedback messages. Base station 110 may process the data group that has been transmitted in the data transmission phase 330 to generate a correction data packet. For example, data processing device 210 may process the first group of data items to provide a second group of data items. For example, the second group of data items may include a number of data items from the first group of data items. The number may be identified as the "second number." The second number of data items may include all or a portion of the first number of date items from the first group of data items that have been transmitted in data transmission phase 330. For example, the second group of data items may include at least the data items that are received by mobile stations with errors. Data coding device 220 may generate the correction data packet based on the second group of data items and information obtained from the feedback messages. Base station 110 may transmit, in the data retransmission phase 340, the correction data packet simultaneously to the data receiving terminals including mobile station 131. After receiving the correction data packet, the data receiving terminals may process the correction data packet to correct one or more transmission errors, for example, to recover the lost data items.

Consistent with the disclosed embodiments, network coding may implemented at base station 110 to generate the correction data packet. For example, network coding may be implemented using data coding device 220 at base station 110 to encode the second group of data items. Two exemplary network coding schemes consistent with the embodiments of the present disclosure are discussed below. In a first network coding scheme, the size of the first group of data transmitted in data transmission phase 330 may be pre-assigned. For example, the size of the first group of data may be pre-assigned to be n, n being an integer. In other words, the first number, which indicates the total number of data items included in the first group of data, may be pre-assigned to be n. In the first network coding scheme, a group of correction data packets may be generated by base station 110. The group of correction data packets may include a number of correction data packets. The number (identified as the "third number") may be a variable number. In one embodiment, the third number may depend on a total number of transmission errors in a certain turn. For example, if there is one transmission error in turn #1, one correction data packet may be transmitted to correct the one transmission error. If there are two transmission errors in turn #2, two correction data packets may be transmitted to correct the two transmission errors. Thus, the third number in turn #1 may be different from the third number in turn #2.

Figure 5:
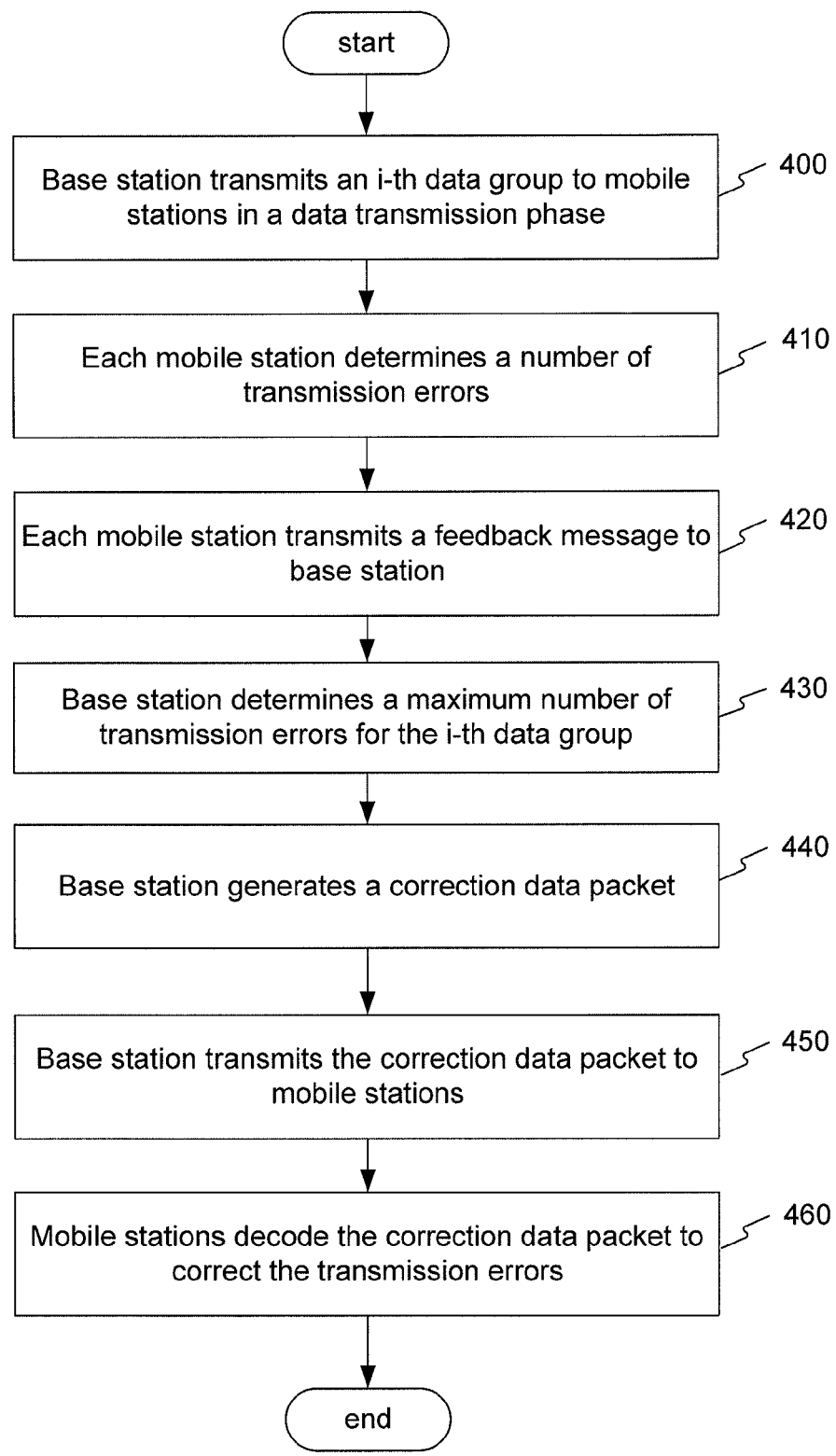
FIG. 5 illustrates an exemplary first network coding scheme consistent with the disclosed embodiments.

FIG. 5 illustrates an exemplary first network coding scheme consistent with the disclosed embodiments. Base station 110 may transmit a plurality of data groups in a sequence to data receiving terminals, such as, mobile stations 131, during a data communication. Assume that in turn #1 (FIG. 4), base station 110 transmits an i-th data group to mobile station 131 in the data transmission phase 330 (Step 400). Index i indicates the sequence position of the data group in the plurality of data groups. The i-th data group may contain the first number of data items, the first number being integer n. After receiving the i-th data group transmitted from base station 110, each mobile station, for example, mobile stations 131 and 132, may determine whether there is an transmission error. Mobile stations 131 and 132 may also determine the number of transmission errors (Step 410).

For illustrative purposes, assume that there are M mobile stations, each mobile station being associated with an index j, j=1, 2, ..., M, and that the j-th and (j+1)-th mobile stations are mobile stations 131 and 132, respectively. The j-th mobile station 131 may determine the number of transmission errors associated with the i-th data group to be L(j, i). Similarly, the (j+1)-th mobile station 132 may determine the number of transmission errors associated with the i-th data group to be L(j+1, i). Each mobile station may transmit a feedback message to base station 110 to report the number of transmission errors (Step 420).

After receiving the feedback messages from the mobile stations, base station 110 may determine a maximum number of transmission errors occurred in the data transmission phase 330 associated with the i-th data group (Step 430). For example, base station 110 may determine, from the feedback messages, the maximum number of transmission errors associated with the i-th data group to be F(i)=max {L(j, i), for all j=1, 2, ..., M}.

Base station 110 may generate a correction data packet configured for correcting the transmission errors associated with the i-th data group (Step 440). Base station 110 may use a network coding to generate the correction data packet. Base station 110 may transmit, in the data retransmission phase 340, the correction data packet to mobile stations, such as mobile stations 131 and 132 (Step 450). Mobile stations 131 and 132 may decode the network coded correction data packet, and may use the decoded correction data packet to correct the transmission errors, e.g., to recover the lost data items (Step 460). In some embodiments, if one or more mobile stations 131 and 132 fail to recover the lost data items using the correction data packet, one or more of the steps 410-460 may be repeated. For example, the correction data packet may be retransmitted from base station 110 to mobile stations 131 and 132, and the step 460 may be repeated.

The correction data packet may be generated based on the second group of data items, which includes the second number of data items from the i-th data group that has been transmitted in the data transmission phase 330. In one embodiment, the second number may be pre-assigned. For example, the second group of data items may include all of the n data items of the i-th data group, and the second number may be the same as the first number, which is n. The correction data packet may be a linear or non-linear combination of all of the n data items of the i-th data group. For example, the correction data packet, denoted as Pc, may be a linear combination of all of the n data items of the i-th data group: $P_c = c_1 * d_1 + c_2 * d_2 + \ldots + c_n * d_n$, where $C \times [c_1, c_2, \ldots, c_n]$ is a coefficient vector, $D = [d_1, d_2, \ldots, d_n]^T$ is a data vector containing all of the n data items $d_1, d_2, \ldots, d_n$ included within the i-th data group, and n is the first number, i.e., the size of the i-th data group. Pc may also be expressed as Pc=C*D.

In some embodiments, the third number, which indicates the total number of correction data packets included in the group of correction data packets base station 110 retransmitted in the data retransmission phase 340, may depend on the number of the transmission errors. For example, if the maximum number of transmission errors occurred to mobile stations 131 and 132 is one, base station 110 may generate one correction data packet, and the third number is one. If the maximum number of transmission errors is two, base station 110 may generate two correction data packets for mobile stations 131 and 132 to correct transmission errors, and the third number is two. Assume that the group of correction data packets are denoted as $P_{c1}, P_{c2}, \ldots, P_{cm}$, where m is an integer indicating the third number. Each of the m correction data packets, denoted as $P_{cj}$, may be expressed as $P_{cj}=C_j*D_j=[c_{1j}, c_{2j}, \ldots, c_{nj}]*[d_{1j}, d_{2j}, \ldots, d_{jn}]^T$, where index j=1, 2, ..., m. $C_j$ is referred to as a network coding coefficient. The network coding coefficient may be predetermined, and may be provided to mobile stations 131 and 132 before data transmission phase 330 is started, i.e., before the start of the transmission of any data group. Alternatively, the network coding coefficient $C_j$ may be provided to mobile stations 131 and 132 within a header section of the correction data packets transmitted in the data retransmission phase 340.

When m data items are lost during the data transmission phase 330, base station 110 may generate m network coded correction data packets, and transmit the m network coded correction packets to mobile stations 131 and 132 in the data retransmission phase 340. Regardless which data items are lost, the network coding coefficients should be designed such that mobile stations 131 and 132 could recover the m lost data items using the m network coded correction data packets. The design of the network coding coefficients may require the least number of correction data packets. For example, one network coded correction data packet may be sufficient for mobile stations 131 and 132 to recover one lost data item, and two network coded correction data packets may be sufficient for mobile stations 131 and 132 to recover two lost data items. The number of network coded correction data packets may be proportional to the number of lost data items among the mobile stations 131 and 132.

In one embodiment, the network coding coefficients $C_j$, j=1, 2, ..., m, may be linearly-independent. The meaning of the term "linearly-independent" with respect to a group of network coding coefficients $C_j$ in vector forms is known in the art. One of ordinary skill in the art can appreciate that vectors $C_j$ are linearly-independent, if and only if, for any given vector, for example, $C_2$, vector $C_2$ cannot be expressed as a linear combination of any number of the remaining vectors $C_j$ (for all j, except j=2).

In one embodiment, circular coefficients may be linearly-independent, and may be used as network coding coefficients. For example, circular coefficients $C_1=[1\ 2\ 3\ 4\ 5\ 6]$, $C_2=[2\ 3\ 4\ 5\ 6\ 1]$, $C_3[3\ 4\ 5\ 6\ 1\ 2]$, $C_4=[4\ 5\ 6\ 1\ 2\ 3]$, $C_5=[5\ 6\ 1\ 2\ 3\ 4]$, and $C_6=[6\ 1\ 2\ 3\ 4\ 5]$, may be used as network coding coefficients.

Figure 6:
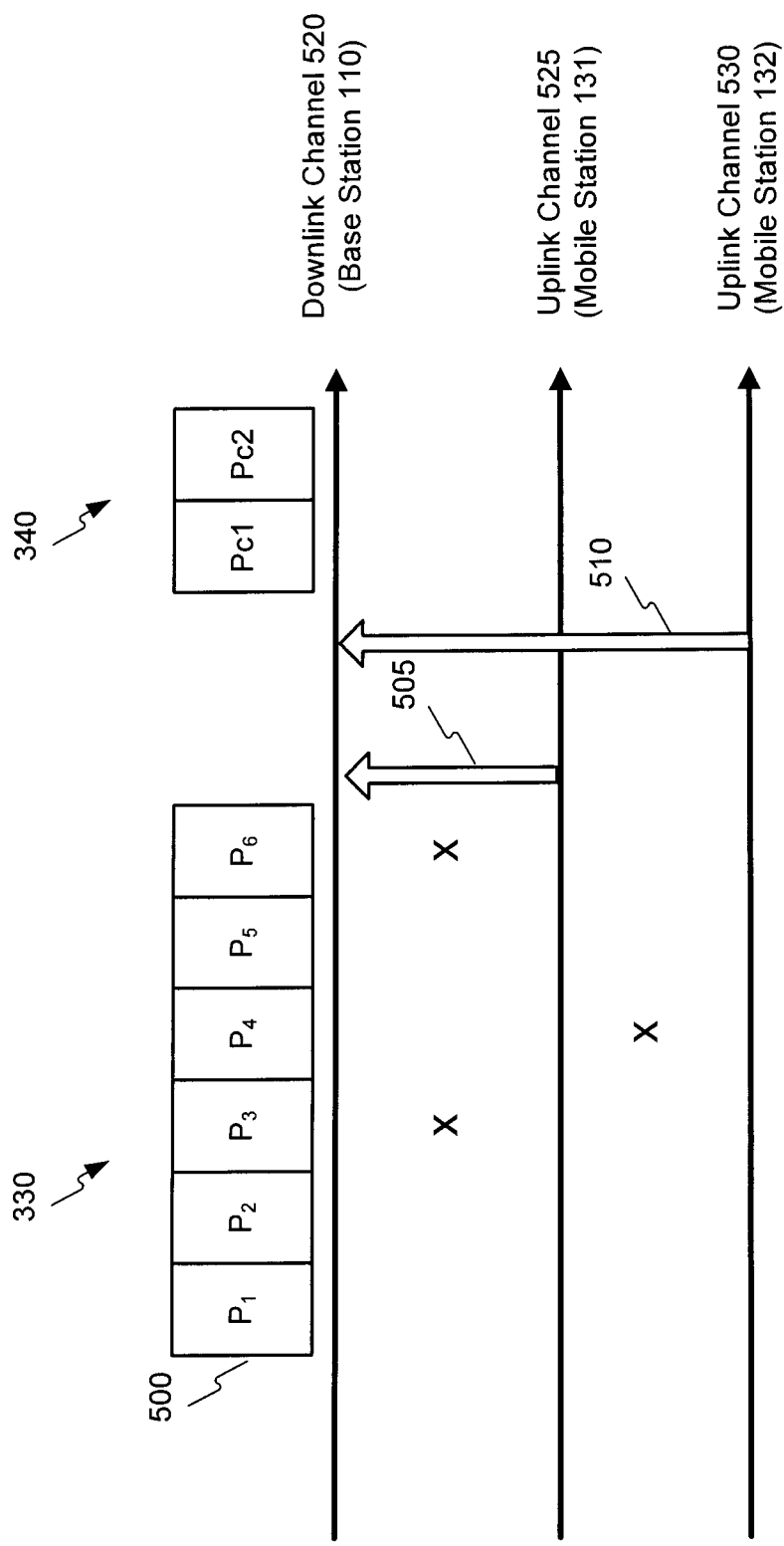
FIG. 6 illustrates an exemplary data transmission process consistent with the disclosed embodiments.

FIG. 6 illustrates an exemplary data communication process consistent with the disclosed embodiments. In the data transmission phase 330, base station 110 may transmit, via a downlink channel 520, a data group 500 including six data items, P1, ..., P6, to mobile stations 131 and 132. Mobile station 131 may transmit a feedback message 505, via an uplink channel 525, to base station 110. The feedback message 505 may indicate that two data items P3 and P6 are lost during the data transmission phase 330. Similarly, mobile station 132 may transmit a feedback message 510, via an uplink channel 530, to base station 110. The feedback message 510 may indicate that one data item P4 is lost during the data transmission phase 330. Base station 110 may determine a maximum number of lost data items from the received feedback messages 505 and 510. The maximum number of lost data items in this example is two. Base station 110 may generate a first correction data packet Pc1 and a second correction data packet Pc2 using the network coding scheme discussed above. For example, the first correction data packet Pc1 may be expressed as $Pc1=P_1+P_2+P_3+P_4+P_5+P_6$, and the second packet Pc2 may be expressed as $Pc2=P_1+2*P_2+3*P_3+4*P_4+5*P_5+6*P_6$. Each of the first and second data packets is a linear combination of the data items of the data group transmitted in the data transmission phase 330. Note that the network coding coefficients $C_1=[1\ 1\ 1\ 1\ 1\ 1]$ and $C_2=[1\ 2\ 3\ 4\ 5\ 6]$ are linearly-independent from each other. Base station 110 may transmit the first and second correction data packets Pc1 and Pc2 simultaneously to mobile stations 131 and 132 in the data retransmission phase 340. After receiving the network coded first and second correction data packets Pc1 and Pc2, mobile stations 131 and 132 may decode the first and second correction data packets Pc1 and Pc2, and use the decoded first and second correction data packets Pc1 and Pc2 to recover the lost data items.

Figure 7:
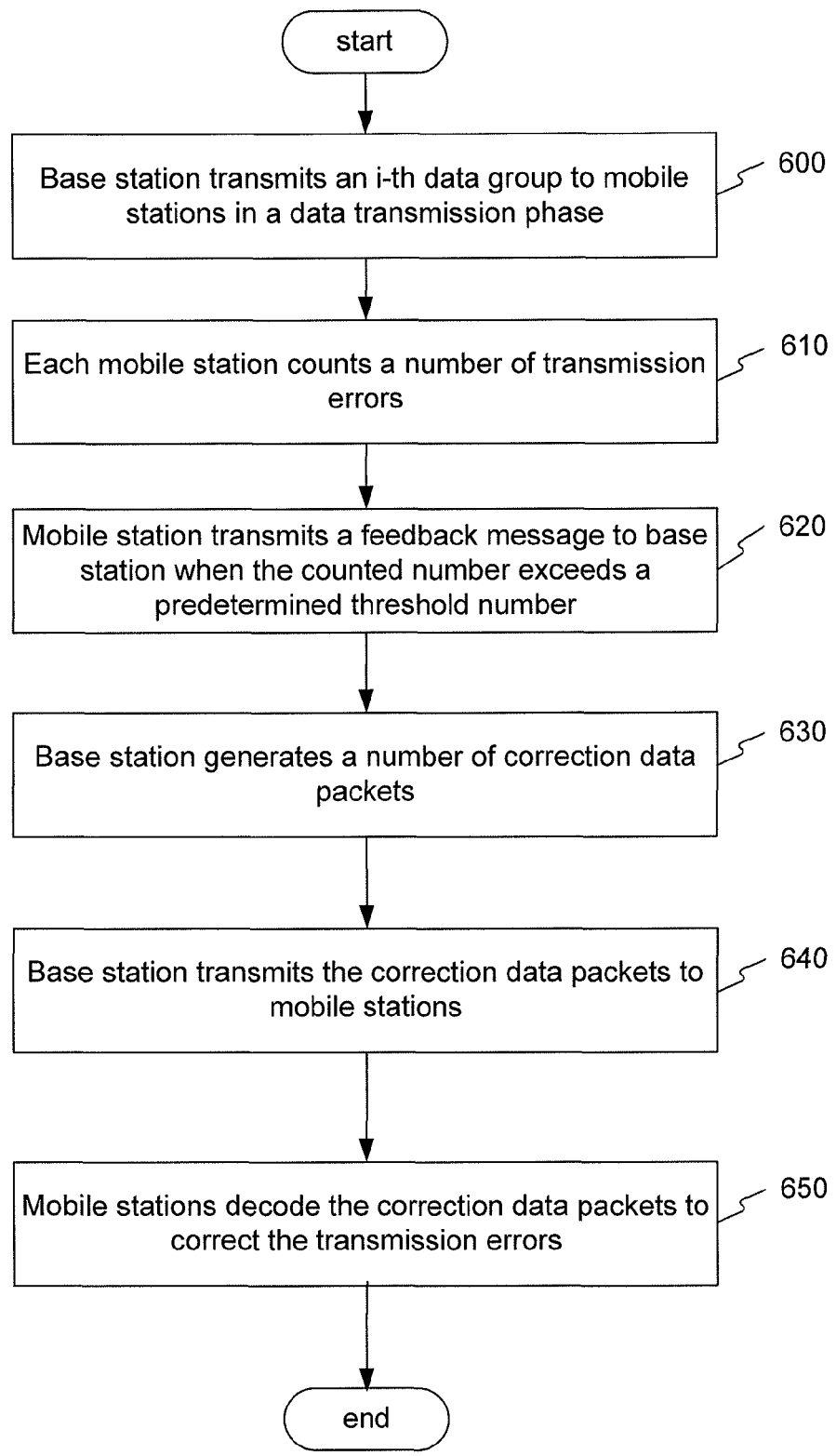
FIG. 7 illustrates an exemplary second network coding scheme consistent with the disclosed embodiments.

FIG. 7 illustrates an exemplary second network coding scheme consistent with the disclosed embodiments. In the second network coding scheme, the size of the data group is variable. In other words, the first number may be variable for different turns. For example, the first number indicating the number of data items included in the i-th data group transmitted in the data transmission phase 330 in turn #1 may be different from the first number indicating the number of data items included in the (i+1)-th data group transmitted in the data transmission phase 350 in turn #2.

In the second network coding scheme, base station 110 may continuously transmit data items of the i-th data group to mobile stations in the data transmission phase 330 (Step 600). During the transmission of the i-th data group in the data transmission phase 330, each mobile station may independently count the number of transmission errors occurred at the mobile station (Step 610). If the counted number of transmission errors at any mobile station, for example, mobile station 131, exceeds a predetermined threshold number, mobile station 131 may transmit the feedback message 345 to base station 110 (Step 620). Base station 110 may generate a group of correction data packets (Step 630). Each correction data packet within the group of correction data packets may be generated based on the second group of data items from the i-th data group. The second group of data items may include a portion of the first group of data items that has been transmitted in the data transmission phase 330. The second group of data items may have been network coded. In one embodiment, each correction data packet may be generated using all of the data items included in the i-th data group. The third number may be related to the predetermined threshold number. For example, if the predetermined threshold number is 1, the third number may be 1, and if the predetermined threshold number is 2, the third number may be 2. Thus, since the threshold number is predetermined, the third number may also be pre-assigned.

Base station 110 may transmit the group of correction data packets to the mobile stations (Step 640). Mobile stations may decode the group of correction data packets and use the decoded correction data packets to recover the lost data items (Step 650). Those mobile stations that have zero transmission error may not perform step 650. If any mobile station having more than zero transmission error fails to recover the lost data items using the group of correction data packets, for example, due to reception of the correction data packets with errors, step 640 may be repeated.

The following example further illustrates the second network coding scheme. Assume that during the transmission of the i-th data group that includes data items $P_1$ to $P_{k-1}$, there is exactly one lost data item for an i-th mobile station $MS_i$. Also assume that the predetermined threshold number for transmission errors is 1. If the next data item $P_k$ transmitted following data item $P_{k-1}$ is also lost for the i-th mobile station $MS_i$, the number of lost data items counted at the i-th mobile station $MS_i$ will be two, which exceeds the predetermined threshold number one. The i-th mobile station MS, may transmit a feedback message to base station 110 to report the loss of data items.

After receiving the feedback message from the i-th mobile station $MS_i$, base station 110 may process the i-th data group to provide the second group of data items. The data items included in the second group may contain at least a portion of the data items included in the i-th data group, for example, data items $P_1$ through $P_{k-1}$. Base station 110 may generate a correction data packet R using a suitable network encoding algorithm, such as, XOR (exclusive OR operation). The correction data packet R may be generated based the second group of data items. In one embodiment, the correction data packet R may be generated based on the data items $P_1$ through $P_{k-1}$: $R=(P_1\oplus \ldots \oplus P_{k-1})$, where symbol $\oplus$ denotes the operation of XOR. Base station 110 may transmit the correction data packet R to the mobile stations for correcting transmission errors. Because there is at most one lost data item between the transmission of data items $P_1$ and $P_{k-1}$ in each mobile station, each mobile station may recover the lost data item using the correction data packet R.

In one embodiment, after the correction data packet R is transmitted, base station 110 may transmit the (i+1)-th data group in the data transmission phase 350. The (i+1)-th data group may include the lost data item $P_k$. The lost data item $P_k$ may be retransmitted. Mobile stations may use the retransmitted data item $P_k$ to recover the same data item $P_k$ lost in the data transmission phase 330. After mobile stations recover the lost data item $P_k$ using the retransmitted data item $P_k$, the number of lost data items in the mobile stations may be set to be zero. That is, the number of transmission errors associated with the (i+1)-th data group at the mobile stations may be reset to be zero. For example, a value associated with counter 270, which indicates the number of transmission errors associated with the (i+1)-th data group at mobile station 131, may be reset to be zero. Base station 110 may continue transmitting data items of the (i+1)-th data group, such as, data items $P_{k+1}, P_{k+2}$, etc. The subsequent processes in data transmission turn #2 may be similar to those discussed above with respect to the i-th data group in data transmission turn #1.

In another embodiment, after the correction data packet R is transmitted, base station 110 may start transmission of the (i+1)-th data group in the data transmission phase 350. In this embodiment, the data item $P_k$ may not be retransmitted. Instead, base station 110 may continue to transmit data item $P_{k+1}, P_{k+2}$, etc. The lost data item $P_k$ which is not retransmitted, may be treated as one lost data item for the (i+1)-th data group at the i-th mobile station $MS_i$, and any other mobile stations that have received the data item $P_k$ with errors in the data transmission phase 330. Thus, the number of transmission errors associated with the (i+1)-th data group at the i-th mobile station MS, and at those mobile stations that have received data item $P_k$ with errors, may be set to a predetermined number, for example, one. For example, a value associated with counter 270, which indicates the number of transmission errors associated with the (i+1)-th data group at mobile station 131, may be set to be one. For those mobile stations, which have correctly received the data item $P_k$ in the data transmission phase 330 without any errors, the number of lost data item for the (i+1)-th data group may be zero. In those mobile stations that have correctly received the data item $P_k$ in the data transmission phase 330, the number of transmission errors associated with the (i+1)-th data group may be set to be zero. For example, the values of the counters in those mobile stations, which indicate the numbers of transmission errors at those mobile stations, may be reset to be zero. If the i-th mobile station $MS_i$ incorrectly receives another data item, for example, $P_n$, the i-th mobile station $MS_i$ will have two lost data items, which exceeds the predetermined threshold number, which is one. This may trigger transmission of a feedback message 365 from the i-th mobile station $MS_i$ to base station 110 to report the loss. After receiving the feedback message 365, base station 110 may generate a correction data packet R" using network coding. For example, the correction data packet may be expressed as $R''=(P_k\oplus P_{k+1}\oplus \ldots \oplus P_{n-1})$. Base station 110 may transmit the correction data packet R" in the data retransmission phase 360 to mobile stations for correcting the transmission errors. The subsequent process in turn #2 may be similar to those discussed above with respect to the i-th data group in turn #1.

The disclosed methods and systems may be employed in wireless communication systems or other systems where data transmission may be performed. For example, the disclosed methods and systems for data transmission may be implemented in a Multicast Broadcast Services communication system. The disclosed network coding schemes may improve the reliability and efficiency of data transmissions, and in particular, data communications for Multicast Broadcast Services.

It will be apparent to those skilled in the art that various modifications and variations can be made to the disclosed methods and systems for data communication. It is intended that the specification and examples be considered as exemplary only, with a true scope of the disclosure being indicated by the following claims and their equivalents.

What is claimed is:

1. A method for data communication, comprising:
   transmitting, by a data communication device, a data group comprising a first group of data items having a first number of data items;
   receiving, by the data communication device, a feedback message indicating a transmission error relating at least a portion of the first group of data items transmitted from the data communication device;
   processing the first group of data items, by a data processing device, to provide a second group of data items having a second number of data items based on the first group of data items;
   generating, by a data coding device, a correction data packet based on the second group of data items and information included in the feedback message, the correction data packet being configured for correcting the transmission error and comprising a portion of the first group of data items; and
   transmitting, by the data communication device, the correction data packet.

2. The method of claim 1, wherein the method is implemented within a communication system comprising a multicast broadcast system having the data communication device as a base station, and wherein at least one of the data group and the correction data packet includes multicast broadcast service data.

3. The method of claim 1, wherein the feedback message is received through at least one of a common feedback channel and a unicast feedback channel.

4. The method of claim 1, further comprising:
network coding the second group of data items; and
wherein the correction data packet is generated based on the network coded second group of data items.

5. The method of claim 1, further comprising:
generating a group of correction data packets having a third number of correction data packets,
wherein at least one of the first number and the second number comprises a pre-assigned number; and
wherein the third number is variable.

6. The method of claim 5, further comprising:
obtaining a total number of transmission errors from the feedback message; and
determining the third number of correction data packets based on the total number of transmission errors.

7. The method of claim 6, wherein determining the third number of correction data packets is carried out after transmitting the data group is complete.

8. The method of claim 5, wherein each correction data packet included in the group of correction data packets is a linear combination of the second group of data items, the linear combination being based on a set of linearly-independent coefficients.

9. The method of claim 8, wherein the set of linearly-independent coefficients is predetermined, and is provided to at least one data receiving terminal before transmitting the data group, or is provided to the at least one data receiving terminal within a header section of each of the correction data packets.

10. The method of claim 1, further comprising:
generating a group of correction data packets having a third number of correction data packets,
wherein at least one of the first number and the second number is variable, and
wherein the third number is a pre-assigned number.

11. The method of claim 1, wherein receiving the feedback message comprises receiving the feedback message when a total number of transmission errors associated with transmitting the data group exceeds a predetermined threshold number.

12. The method of claim 1, wherein generating the correction data packet comprises:
network coding the second group of data items.

13. The method of claim 1, further comprising:
retransmitting a last data item corresponding to a last transmission error associated with transmitting the data group; and
transmitting a subsequent data group after the last data item is retransmitted.

14. The method of claim 1, further comprising:
transmitting a subsequent data group without retransmitting a last data item corresponding to a last transmission error associated with transmitting the data group, the subsequent data group including the last data item corresponding to the last transmission error.

15. A method for data communication, comprising:
receiving, by at least one data receiving terminal, a data group comprising a first group of data items having a first number of data items transmitted from a data communication device;
providing, by the at least one data receiving terminal, a feedback message to the data communication device, the feedback message indicating a transmission error;
receiving, by the at least one data receiving terminal, a correction data packet configured for correcting the transmission error;
decoding, by the at least one data receiving terminal, the correction data packet; and
correcting, by the at least one data receiving terminal, the transmission error based on the decoded correction data packet.

16. The method of claim 15, wherein providing the feedback message comprises providing the feedback message after receiving the data group.

17. The method of claim 15, wherein the transmission error comprises a plurality of transmission errors, the method further comprising:
counting a total number of transmission errors associated with receiving the data group,
wherein providing the feedback message comprises providing the feedback message when the total number of transmission errors exceeds a predetermined threshold number.

18. The method of claim 17, wherein the data group is a first data group, the method further comprising:
receiving a last data item retransmitted from the data communication device, the last data item corresponding to a last transmission error associated with receiving the first data group;
resetting a total number of transmission errors associated with a second data group to a predetermined number, after receiving the last data item retransmitted from the data communication device; and
receiving the second data group.

19. The method of claim 17, wherein the data group is a first data group, the method further comprising:
receiving a second data group after correcting the transmission errors associated with the first data group, and without receiving a retransmission of a last data item corresponding to a last transmission error occurred to the first data group; and
setting a total number of transmission errors associated with the second data group to a predetermined number.

20. A system for data transmission, comprising:
a data communication device configured to:
transmit a data group comprising a first group of data items having a first number of data items;
receive a feedback message indicating a transmission error associated with the data group;
apply a network coding to a second group of data items having a second number of data items obtained from the data group;
generate a correction data packet based on the second group of data items and information from the feedback message, the correction data packet configured for correcting the transmission error; and
transmit the correction data packet; and
a data receiving terminal configured to:
receive the data group comprising the first group of data items;
provide a feedback message to the data communication device, the feedback message indicating the transmission error that is associated with the data group;
receive the correction data packet;
decode the correction data packet; and
correct the transmission error based on the decoded correction data packet.

21. The system of claim 20, wherein the system is implemented as part of a multicast broadcast system having the data communication device as a base station, and wherein the data group includes multicast broadcast service data.

22. The system of claim 20, wherein the communication device is further configured to generate a group of correction data packets having a third number of correction data packets, wherein at least one of the first number and the second number is pre-assigned, and wherein the third number is variable.

23. The system of claim 20, wherein the communication device is further configured to generate a group of correction data packets having a third number of correction data packets, wherein the third number is pre-assigned, and at least one of the first number and the second number is variable.

24. The system of claim 20, wherein the data receiving terminal includes a plurality of data receiving terminals, each of the plurality of data receiving terminals providing a feedback message indicating a transmission error, and the data transmission device is further configured to:
   receive a plurality of feedback messages from the plurality of data receiving terminals; and
   determine a maximum number of transmission errors based on the plurality of feedback messages.

25. The system of claim 20, wherein the data receiving terminal includes a counter configured to count a number of transmission errors, and wherein the data receiving terminal is configured to provide the feedback message after the counted number of transmission errors exceeds a predetermined threshold number.

* * * * *